United States Patent
Yu et al.

(10) Patent No.: US 11,352,284 B2
(45) Date of Patent: Jun. 7, 2022

(54) SYSTEM FOR URBAN ORGANIC SOLID WASTE PYROLYSIS-GASIFICATION COUPLED WITH DRYING

(71) Applicant: HUBEI GREEN DEVELOPMENT TECHNOLOGY CO., LTD., Hubei (CN)

(72) Inventors: Qiao Yu, Hubei (CN); Mingzhao Tan, Hubei (CN); Pengfei Yuan, Hubei (CN); Taohong Zhou, Hubei (CN); Limin Zhang, Hubei (CN); Caifeng Ma, Hubei (CN); Leizeyu Zhang, Hubei (CN)

(73) Assignee: HUBEI GREEN DEVELOPMENT TECHNOLOGY CO., LTD., Hubei (CN)

( * ) Notice: Subject to any disclaimer, the term of this patent is extended or adjusted under 35 U.S.C. 154(b) by 188 days.

(21) Appl. No.: 16/716,712

(22) Filed: Dec. 17, 2019

(65) Prior Publication Data

US 2020/0207653 A1    Jul. 2, 2020

(30) Foreign Application Priority Data

Dec. 28, 2018 (CN) .......................... 201811625053.7

(51) Int. Cl.
*C02F 11/10* (2006.01)
*C02F 11/16* (2006.01)

(52) U.S. Cl.
CPC .............. *C02F 11/10* (2013.01); *C02F 11/16* (2013.01)

(58) Field of Classification Search
None
See application file for complete search history.

(56) References Cited

U.S. PATENT DOCUMENTS

| 1,375,476 | A | * | 4/1921 | Van Ackeren | C01C 1/12 |
| | | | | | 423/550 |
| 4,291,636 | A | * | 9/1981 | Bergsten | C10J 3/08 |
| | | | | | 110/346 |
| 2005/0188841 | A1 | * | 9/2005 | Khan | B01D 53/14 |
| | | | | | 95/8 |

FOREIGN PATENT DOCUMENTS

| CN | 102794245 | A | * | 11/2012 | |
| CN | 102863081 | A | * | 1/2013 | C02F 3/327 |

(Continued)

*Primary Examiner* — Brad Gordon
(74) *Attorney, Agent, or Firm* — Tim Tingkang Xia, Esq.; Locke Lord LLP

(57) ABSTRACT

A system for urban organic solid waste pyrolysis-gasification coupled with drying includes a sludge feeding and storage device, a pre-drying device, a cyclone separator, a specific cloth bag for sludge and a flue gas waste heat recovery device sequentially connected. The cyclone separator and a sludge outlet of the specific cloth bag for sludge are connected with a cyclone fluidized bed gasification furnace. The cyclone fluidized bed gasification furnace is connected with a high-temperature separator. The high-temperature separator is connected with a secondary combustion chamber. High-temperature flue gas generated by the secondary combustion chamber serves as a heat source of the pre-drying device. Ash generated by the high-temperature separator and secondary combustion chamber is sent to an ash bin after being cooled by a cold slag conveyor. Through system integration and optimization, the disclosure adopts a two-stage process of pre-drying and pyrolysis-gasification, thus having high process controllability and operability.

8 Claims, 6 Drawing Sheets

(56) References Cited

FOREIGN PATENT DOCUMENTS

| CN | 205115263 | U | * | 3/2016 |
| CN | 205115263 | U |   | 3/2016 |
| JP | H0733573  | A | * | 2/1995 |

* cited by examiner ns cross-reference to related application

This application claims priority to Chinese Patent Application No. 201811625053.7, filed Dec. 28, 2018 in the State Intellectual Property Office of P.R. China, which is hereby incorporated herein in its entirety by reference.

TECHNICAL FIELD

The disclosure relates to the field of eco-environment protection, in particular to a system for urban organic solid waste pyrolysis-gasification coupled with drying.

BACKGROUND

It is predicted that the sludge output of urban sewage plants will reach more than 80 million tons by 2020. Sludge has high water content, tends to rot to produce strong odor, and contains a large number of pathogenic bacteria and parasite eggs, heavy metals such as chromium and mercury, dioxin and other toxic, harmful and carcinogenic substances that are difficult to degrade. How to make sludge harmless and resourceful is an important environmental protection topic.

Sludge should be "treated according to disposal". The disposal methods of sludge mainly include sanitary landfill, land use, building material production and incineration. Sanitary landfill is adopted increasingly less due to the restriction of land availability and the hidden danger of pollution to soil and groundwater. Land use is constrained by problems such as difficulty in retrospective management and difficulty in starting a chain of industrialized utilization. Building material utilization and sludge incineration are feasible sludge disposal methods suitable for actual conditions in China.

By means of pyrolysis-gasification of sludge, that is, to perform thermochemical disposal on sludge in an anoxic reducing atmosphere, the emission of pollutants such as NOx, SOx and heavy metals is far lower than that during incineration. As an upgrade process of traditional incineration, it is one of the most important future development directions.

At present, the pyrolysis-gasification of organic solid wastes such as sludge mostly adopts conventional equipment such as external-heating rotary furnaces and fixed beds, which are not matched with the characteristics of high ash content and low ash melting point of dewatered sludge, the gasification yield is low (<50%), and gasification is incomplete. The Balingen sludge gasification project in Germany conducted by AG company and Tokyo Sewer Bureau of Japan have developed systems for producing gas and generating power by dry sludge gasification. The systems adopt steam pre-drying and are complicated, the energy conversion chain is long, heat loss is large, and the real coupling between drying and pyrolysis-gasification is not realized.

Therefore, the key of the large-scale engineering application and technical and economic feasibility of sludge pyrolysis-gasification is to develop a gasification furnace suitable for sludge characteristics to improve the gasification yield, and improve the comprehensive thermal efficiency of the system, reduce the operation cost and improve the stability and reliability of equipment through the high-level coupling between a pyrolysis-gasification system and a pre-drying device.

SUMMARY

The technical problem to be solved by the disclosure is to provide a system for urban organic solid waste pyrolysis-gasification coupled with drying, which can improve the comprehensive thermal efficiency of the system, reduce the operation cost and improve the stability and reliability of equipment.

The technical solution adopted by the disclosure for solving the technical problem is as follows: a system for urban organic solid waste pyrolysis-gasification coupled with drying is constructed, which comprises a sludge feeding and storage device, a pre-drying device, a cyclone separator, a specific cloth bag for sludge and a flue gas waste heat recovery device which are sequentially connected, wherein the cyclone separator and a sludge outlet of the specific cloth bag for sludge are connected with a cyclone fluidized bed gasification furnace, the cyclone fluidized bed gasification furnace is connected with a high-temperature separator, the high-temperature separator is connected with a secondary combustion chamber, high-temperature flue gas generated by the secondary combustion chamber serves as a heat source of the pre-drying device, and ash generated by the high-temperature separator and the secondary combustion chamber is sent to an ash bin after being cooled by a cold slag conveyor.

In the above solution, the flue gas waste heat recovery device is also sequentially connected with a chemical pre-treatment washing tower, a biological deodorization system, an activated carbon catalytic adsorption device and a chimney.

In the above solution, pneumatic conveying equipment is arranged between the specific cloth bag for sludge and the cyclone fluidized bed gasification furnace.

In the above solution, the cyclone fluidized bed gasification furnace comprises an ash conveying screw arranged at the bottom, an air duct zone is arranged above the ash conveying screw, a dense phase combustion zone is arranged above the air duct zone, an air distribution plate is arranged in the dense phase combustion zone, an ignition device is further arranged on the inner wall of the dense phase combustion zone, a wet sludge inlet and a biomass inlet are further formed in the dense phase combustion zone, a drying zone is arranged above the dense phase combustion zone, and a gasification outlet is also formed in the drying zone.

In the above solution, an air duct is arranged in the air duct zone, the bottom end of the air duct communicates with the ash conveying screw, the top end of the air duct is provided with an air chamber, the top of the air chamber is connected with the air distribution plate, and the periphery of the air duct is provided with an ash discharging channel.

In the above solution, a lean phase zone is arranged above the dense phase combustion zone, a guide plate wide at the upper portion and narrow at the lower portion is arranged on the inner periphery of the lean phase zone, and the top end of the lean phase zone communicates with the drying zone.

In the above solution, the dense phase combustion zone is also provided with a steam injection pipe.

In the above solution, the top of the drying zone is provided with a diffusing pipe.

In the above solution, the air distribution plate comprises a plurality of fan-shaped air nozzle plates, air nozzles are uniformly arranged on each fan-shaped air nozzle plate, and an air disc is arranged at the bottom of each air nozzle.

In the above solution, the distance between the outer periphery of the air distribution plate and a furnace body is 5-10 mm, and the air inlet speed of the air distribution plate is 15-20 m/s.

The system for urban organic solid waste pyrolysis-gasification coupled with drying has the following beneficial effects:

1. Through system integration and optimization, the disclosure adopts a two-stage process of pre-drying and pyrolysis-gasification, thus having high process controllability and operability. Combustible gas generated by pyrolysis-gasification of the cyclone fluidized bed gasification furnace generates high-temperature hot air through the secondary combustion chamber to provide heat for pre-drying, the gradient utilization of energy reduces the energy consumption of the system, the thermal efficiency of the system is greater than 80%, and compared with a traditional fixed bed or steam drying and fluidized bed gasification combined process, the thermal efficiency is improved by 10-15%. Compared with direct incineration, sludge pyrolysis-gasification greatly reduces the emission of NOx, SOx and harmful substances, and reduces the cost for tail gas treatment.

2. The disclosure solves the problems that a conventional mechanical fluidizing device causes severe abrasion to high-water-content and high-viscosity sludge and tends to cause wall adhesion and blockage and the like. Sludge particles dried by the pre-drying device are 2-5 mm in particle size, which are basically consistent with the particle size of the bed material of a fluidized bed. Based on the characteristics of light density and low ignition point of biomass, a cyclone zone is arranged on the basis of a conventional fluidized bed, so that the gasification reaction residence time of biomass and sludge is strengthened; and ash generated after gasification of the sludge and biomass is used as part of the bed material for multiple circular reactions, and pyrolysis-gasification is complete. The pyrolysis-gasification coupling of sludge and other organic solid wastes such as biomass is realized.

3. The waste heat flue gas of the secondary combustion chamber is dried to serve as the heat source of the pre-drying device, which reduces the heat conversion links compared with traditional steam drying, and improves the thermal efficiency of the system by 10% or above. A drying system of the pre-drying device is highly coupled with a pyrolysis-gasification system of the cyclone fluidized bed gasification furnace, the system flow is short, the number of intermediate links is small, the total investment is reduced by 10-20% compared with the traditional process, and the operation cost is reduced by 15-25%.

BRIEF DESCRIPTION OF THE DRAWINGS

The present disclosure will be further described with reference to the accompanying drawings and embodiments, and in the accompanying drawings.

DETAILED DESCRIPTION OF THE EMBODIMENTS

In order to have a clearer understanding of the technical features, objectives and effects of the present disclosure, detailed description of the embodiments of the present disclosure will now be provided with reference to the accompanying drawings.

Figure 1:
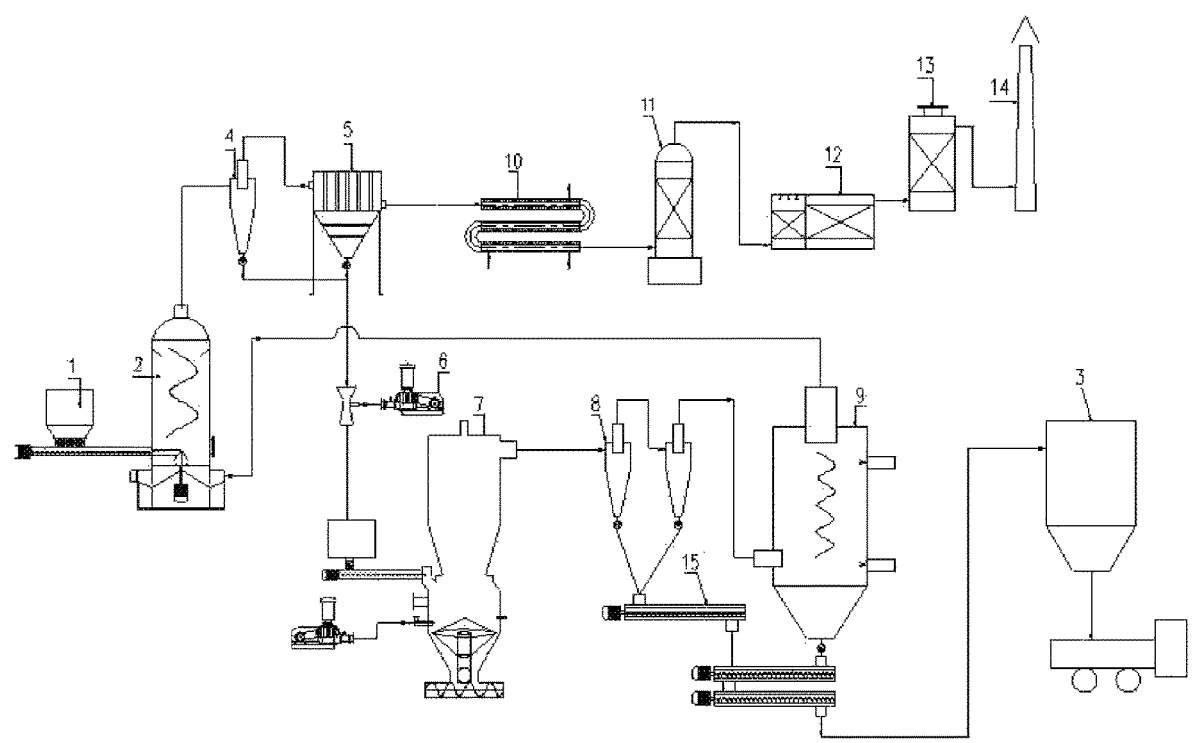
FIG. 1 is a structural diagram of a system for urban organic solid waste pyrolysis-gasification coupled with drying according to the present disclosure.
Figure 2:
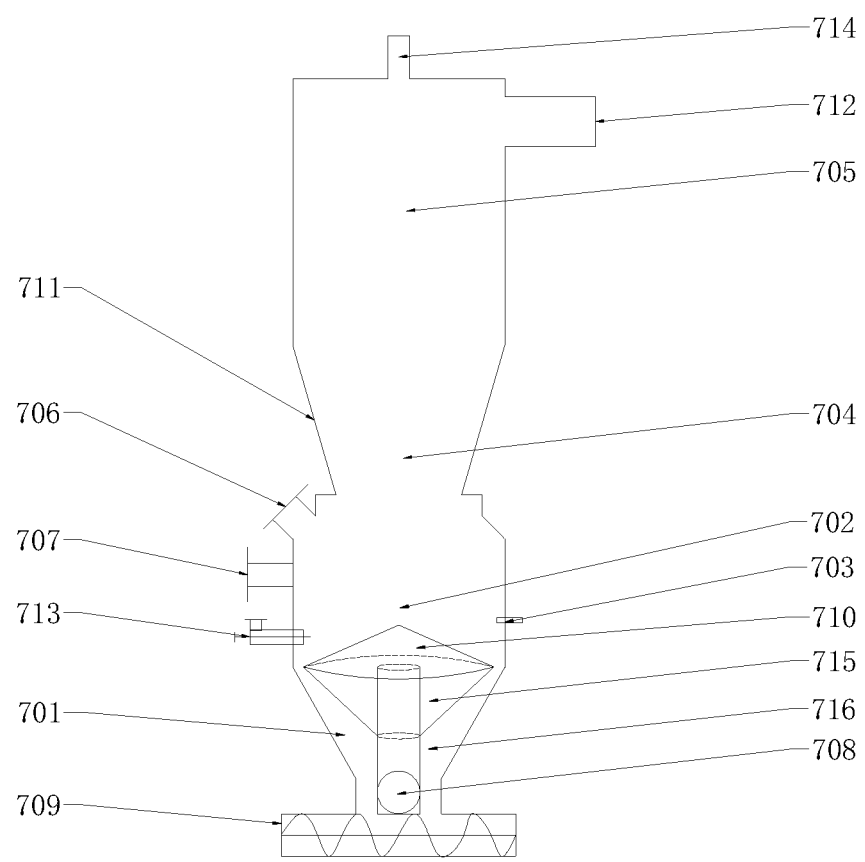
FIG. 2 is a structural diagram of a cyclone fluidized bed gasification furnace.
Figure 3:
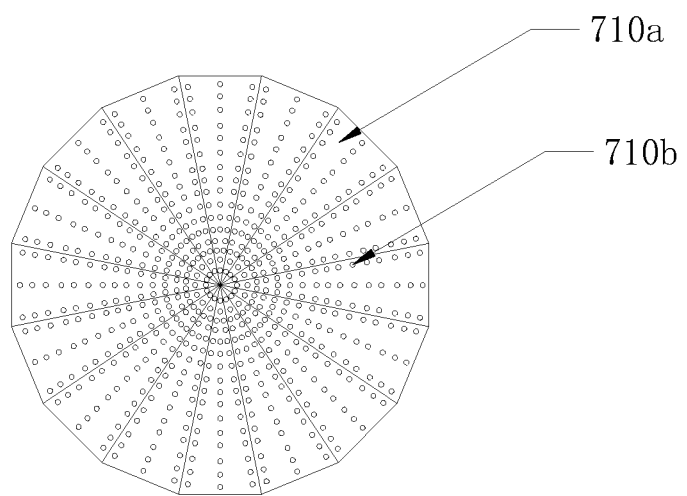
FIG. 3 is a structural diagram of an air distribution plate.
Figure 4:
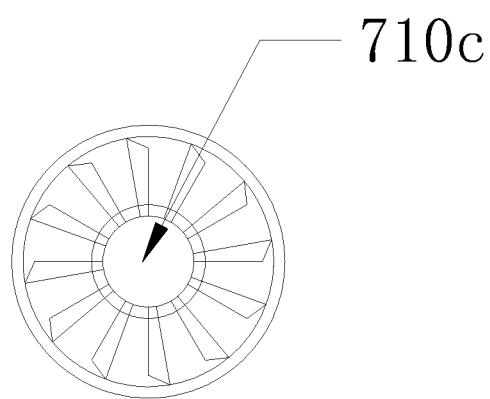
FIG. 4 is a structural diagram of an air disc.
Figure 5:
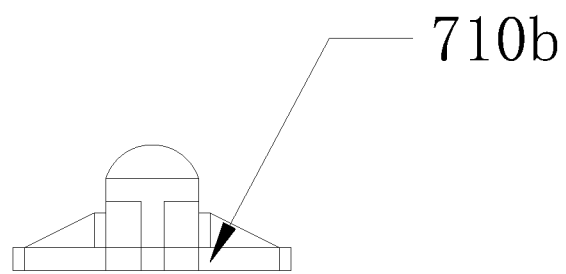
FIG. 5 is a structural diagram of an air nozzle.
Figure 6:
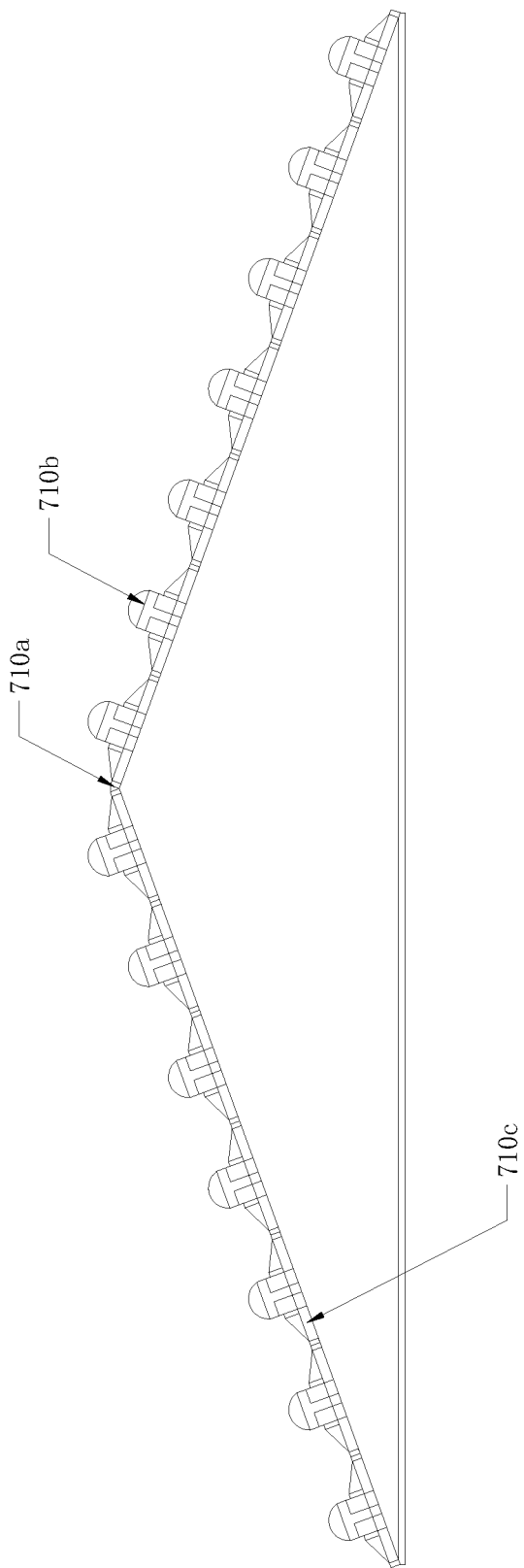
FIG. 6 is a diagram of the arrangement of the air discs and the air nozzles on the air distribution plate.

As shown in FIG. 1, a system for urban organic solid waste pyrolysis-gasification coupled with drying according to the disclosure comprises a sludge feeding and storage device 1, a pre-drying device 2, a cyclone separator 4, a specific cloth bag for sludge 5 and a flue gas waste heat recovery device 10 which are sequentially connected.

The cyclone separator 4 and a sludge outlet of the specific cloth bag for sludge 5 are connected with a cyclone fluidized bed gasification furnace 7, the cyclone fluidized bed gasification furnace 7 is connected with a high-temperature separator 8, the high-temperature separator 8 is connected with a secondary combustion chamber 9, high-temperature flue gas generated by the secondary combustion chamber 9 serves as a heat source of the pre-drying device 2, and ash generated by the high-temperature separator 8 and the secondary combustion chamber 9 is sent to an ash bin 3 after being cooled by a cold slag conveyor 15. The flue gas waste heat recovery device 10 is also sequentially connected with a chemical pretreatment washing tower 11, a biological deodorization system 12, an activated carbon catalytic adsorption device 13 and a chimney 14.

The sludge feeding and storage device 1 consists of a sludge receiving bin, a plurality of feeding screws and a metering screw. Urban sludge is transported to the sludge receiving bin in a feeding, storage and metering system by a sealed transport vehicle or a sludge pump to adjust and balance the flow rate of a subsequent system, and is metered through the metering screw at the bottom of the sludge receiving bin and transported to the pre-drying device 2.

The pre-drying device 2 is sludge drying equipment using low-temperature flue gas disclosed in Chinese patent CN205115263U. The pre-drying device 2 comprises a drying cylinder, a centrifugal atomizing disc, a hot air distributor, a spiral feeder and a variable speed motor. The dewatered sludge conveyed by the sludge feeding and storage device 1 is converted into a small-particle-size atomized state through the high-speed centrifugal action of a centrifugal atomizer at the bottom of drying equipment, and the atomized sludge and waste heat flue gas from a biomass gas hot air system rapidly evaporate and carry away water in the sludge through heat and mass exchange on a large specific surface area and through the high-speed centrifugal wall breaking action. The pre-drying device 2 is specially developed for solving the problems of high viscosity of dewatered sludge, tendency to cause wall sticking and blockage, and low heat exchange efficiency of traditional rotary or indirect heat exchange drying equipment. The contact specific surface area of sludge and high-temperature flue gas is improved through high-speed centrifugal atomization, heat exchange is sufficient and only takes 2-6 s, and the whole drying system occupies a small area and has high working efficiency.

The dry sludge is conveyed to the cyclone fluidize bed gasification furnace 7 by spiral or pneumatic conveying equipment 6 for pyrolysis-gasification and degradation into ash and pyrolysis gas, and the gasified ash can be applied to building materials such as cement admixture, ceramsite and thermal insulation materials. After the pyrolysis gas passes through the two-stage high-temperature separator 8, the combustible gas is combusted in the secondary combustion chamber 9 to generate high-temperature hot air flue gas, which is used as the heat source of the pre-drying device 2. The pyrolysis-gasification system adopts the cyclone fluidized bed gasification furnace 7, an air distribution plate of the gasification furnace adopts cone-shaped air distribution, a lower air chamber determines the air supply volume according to the specific upper cone-shaped air distribution, the cone-shaped air distribution enables a bed material to form internal rotation in the combustion gasification process, sludge and biomass in a dense phase zone undergo multiple cycles, the gasification residence time is long, so that the problem of insufficient residence time in the dense phase zone caused by high dry sludge proportion and low biomass proportion is solved, and the synergistic effect of sludge and biomass gasification is realized; in this way, the gasification efficiency of a bed body and the utilization rate of fuel can be greatly improved, the gasification yield is greater than 85%, the thermal efficiency of the gasification system is greater than 90%, and the final residual carbon in the ash can be controlled to be less than 5%.

The cyclone fluidized bed gasification furnace 7 shown in FIGS. 2-6 comprises an ash conveying screw 709 arranged at the bottom, an air duct zone 701 is arranged above the ash conveying screw 709, a dense phase combustion zone 702 is arranged above the air duct zone 701, an air distribution plate 710 is arranged in the dense phase combustion zone 702, an ignition device 713 is further arranged on the inner wall of the dense phase combustion zone 702, a wet sludge inlet 706 and a biomass inlet 707 are further formed in the dense phase combustion zone 702, a drying zone 705 is arranged above the dense phase combustion zone 702, and a gasification outlet 712 is also formed in the drying zone 705. An air duct 708 is arranged in the air duct zone 701, the bottom end of the air duct 708 communicates with the ash conveying screw 709, the top end of the air duct 708 is provided with an air chamber 715, the top of the air chamber 715 is connected with the air distribution plate 710, and the periphery of the air duct 708 is provided with an ash discharging channel 716. A lean phase zone 704 is arranged above the dense phase combustion zone 702, a guide plate 711 wide at the upper portion and narrow at the lower portion is arranged on the inner periphery of the lean phase zone 704, and the top end of the lean phase zone 704 communicates with the drying zone 705. The dense phase combustion zone 702 is also provided with a steam injection pipe 703. The top of the drying zone 705 is provided with a diffusing pipe 714. The air distribution plate 710 comprises a plurality of fan-shaped air nozzle plates 710*a*, air nozzles 710*b* are uniformly arranged on each fan-shaped air nozzle plate 710*a*, and an air disc 710*c* is arranged at the bottom of each air nozzle 710*b*.

In the present embodiment, the distance between the outer periphery of the air distribution plate 710 and a furnace body is 10 mm, and the air inlet speed of the air distribution plate 710 is 20 m/s. The shrinkage of the guide plate 711 in the lean phase zone 704 is 50%. The total height of the ash conveying screw 709, the air duct zone 701, the dense phase combustion zone 702, the drying zone 705 and the lean phase zone 704 is 20 m, and the diameter of the dense phase combustion zone 702 is 5 m.

In actual use:

The cyclone fluidized bed gasification furnace 7 shown in FIGS. 2-6 comprises a dense phase combustion zone 702 for accumulation and combustion of biomass and sludge, a steam injection pipe 703 for controlling the temperature of the combustion zone 3, an ash discharging channel 716 for collecting products after combustion, a lean phase zone 704 for co-gasification of biomass and sludge, a drying zone 705 for drying gas produced from gasification, a wet sludge inlet 706 for sludge feeding, a biomass inlet 707 for biomass feeding, an air duct 708 for combustion in a furnace, an ash conveying screw 709 for ash discharging and collecting, an air distribution plate 710 for forming cyclone in the dense phase combustion zone 702 in the furnace, a guide plate 711 for guiding the flow of the gas produced from biomass and sludge gasification, a gasification outlet 712 for discharging the gas produced from gasification, an ignition device 713 for igniting and supporting combustion, a diffusing pipe 714 for discharging flue gas or safe diffusion when the gasification furnace is started, stopped or under an emergency stop, and an air chamber 715 for mixing and distributing fluidizing air to uniformly distribute air on the air distribution plate 710.

The gasification furnace is blown by a fan, air enters the air chamber 715 from the air duct 708 to complete the mixing and distribution of the fluidizing air, and then the air enters the gasification furnace through the air distribution effect of the air distribution plate 710.

The gas-solid flow in the gasification furnace is reverse. After being added through the biomass inlet 707 and the wet sludge inlet 706, biomass and wet sludge are dried by the rising hot air flow to remove water vapor. The dried sludge is heated and decomposed by the rising air flow in an expanded section of the lean phase zone 704 to release volatile matters. The gas produced from gasification of biomass and sludge rises in the dense phase combustion zone 702, the remaining biomass and sludge are oxidized by air in the dense phase combustion zone 702, and the released combustion heat provides a heat source for the whole gasification process. Biomass gas passes through the drying zone 705 via the guide plate 711 to be dried and then enters the subsequent working section through the gasification outlet 712, and combustion products enter the ash conveying screw 709 through the ash discharging channel 716 and are then discharged.

In the present embodiment, when the gasification furnace is started or stopped, the diffusing pipe 714 at the top can be opened to exhaust flue gas. When the temperature in the furnace is high enough to exceed the ash melting point of the fuel, bed slagging is caused. The temperature of the dense phase combustion zone 702 can be controlled through cooling by the steam injection pipe 703. A hearth is of a circular structure, the air distribution plate 710 is of a polygon similar to a circle composed of a plurality of fan shapes, and the distance between the air distribution plate 710 and the furnace body is 10 mm, which is favorable for ash falling. The air inlet speed of the air distribution plate 710 is 20 m/s, the height of the gasification furnace is 20 m, and the height-diameter ratio of the gasification furnace is 5:1.

In the present embodiment, the lean phase zone 705 is provided with the guide plate 711, the shrinkage of the guide plate 711 is 50%, and the ratio of the furnace diameter to the shrinkage distance is 3.

Ash generated in the high-temperature separator 8 and the secondary combustion chamber 9 is cooled to 100° C. or below by the cold slag conveyor 15 and then sent to an ash bin 3 for storage and regular transportation to an external building material utilization unit for resource utilization and final disposal.

Tail gas generated by the pre-drying device 2 enters a separation dust removal system and a deodorization system, dried sludge and flue gas are separated by the cyclone separator 4 and the specific cloth bag for sludge 5, the flue gas enters the flue gas waste heat recovery device 10, the flue gas waste heat recovery device 10 adopts a finned reinforced air convection condenser, and preheated hot air is sent to the gasification system and the secondary combustion chamber 9, so that heat in the tail gas is recovered in comparison with a traditional water spray cooling mode, and the energy utilization rate is improved by 8%-15%.

The flue gas after waste heat recovery is further cooled and purified by a chemical pretreatment washing tower 11, and an oxidant can also be added according to the situation. The purified tail gas enters a biological deodorization system 12, then enters an activated carbon catalytic adsorption device 13 for further treatment to meet the standard, and is systematically discharged by an induced draft fan and a chimney 14.

SPECIFIC EXAMPLES

A sewage plant produces dewatered sludge (with the water content of 80%) 120 tons/day. A dry sludge conveying screw pump is used to feed the sludge into the sludge feeding and storage device, and then the sludge enters the pre-drying device for drying to reduce the water content to 20-30% and reduce the weight by 30-34.3 tons. The dried sludge is sent to the cyclone fluidized bed gasification furnace through Roots blower pneumatic conveying equipment, the pyrolysis reaction temperature is 600-800° C., and 11.0-13.0 tons of ash and pyrolysis gas are generated through the pyrolysis reaction. The ash is cooled to 100° C. by the cold slag conveyor, then transported into the ash bin in a dense phase mode through a fluidizing transporter, and then to a brick making factory to manufacture products such as walkway bricks so as to realize final disposal and resource utilization. After ash is separated by the high-temperature separator, combustible gas is sent to the secondary combustion chamber to generate high-temperature flue gas which is used as a heat source of the pre-drying device for waste heat drying.

The tail gas in the pre-drying device in this process is treated to meet the standards by tail gas purification and deodorization systems such as the specific cloth bag for sludge, an alkali liquor spray absorption device, the chemical pretreatment washing tower, and the activated carbon catalytic adsorption device, and is systematically discharged by the induced draft fan and the chimney.

The process adopts tail gas waste heat to preheat combustion-supporting air in the secondary combustion chamber and the gasification system, thus realizing the gradient utilization of energy. Compared with the method of adopting a waste heat boiler to produce steam, the process reduces the energy consumption in the intermediate links. Compared with the traditional spiral stirring method, high-speed centrifugal atomization adopted by the flue gas drying system results in a lower failure rate. Compared with traditional steam drying, the heat conversion links are reduced, and the thermal efficiency of the system is improved by 10% or above. The drying system is highly coupled with the pyrolysis-gasification system, the system flow is short, the number of intermediate links is small, the total investment is reduced by 10-20% compared with the traditional process, and the operation cost is reduced by 15-25%.

TABLE 1

Industrial analysis of raw mud

| Sample number | Industrial analysis | | | | |
|---|---|---|---|---|---|
| | Mad % | Aad % | Vad % | Fad | Qb, adKJ/kg |
| Sample 1 | 7.77 | 55.90 | 32.76 | 3.57 | 6500 |
| Sample 2 | 2.55 | 67.35 | 28.32 | 1.78 | 6026 |

TABLE 2

Industrial analysis of ash

| Sample number | Industrial analysis | | | | |
|---|---|---|---|---|---|
| | $M_{ad}$ % | Ash content % | Volatile matter % | Fixed carbon % | Deformation temperature |
| Sample 1 | 0.71 | 98.58 | 0.48 | 0.23 | 1029 |

The embodiments of the present disclosure have been described above with reference to the accompanying drawings, but the present disclosure is not limited to the above-mentioned specific embodiments. The above-mentioned specific embodiments are merely illustrative and not restrictive. Under the inspiration of the present disclosure, one of ordinary skill in the art can also make many forms without departing from the purpose of the present disclosure and the scope protected by the claims, all of which are within the protection of the present disclosure.

What is claimed is:

1. A system for urban organic solid waste pyrolysis-gasification coupled with drying, comprising:
    a sludge feeding and storage device (1),
    a pre-drying device (2) connected to the sludge feeding and storage device (1),
    a cyclone separator (4) connected to the pre-drying device (2),
    a cloth bag for sludge (5) connected to the cyclone separator (4),
    a flue gas waste heat recovery device (10) connected to the cloth bag for sludge (5),
    a cyclone fluidized bed gasification furnace (7) connected to the cyclone separator (4) and a sludge outlet of the cloth bag for sludge (5),
    a high-temperature separator (8) connected to the cyclone fluidized bed gasification furnace (7),
    a secondary combustion chamber (9) connected to the high-temperature separator (8),
    a cold slag conveyor (15) connected to the high-temperature separator (8) and the secondary combustion chamber (9), and
    an ash bin (3) connected to the cold slag conveyor (15).

2. The system according to claim 1, further comprising pneumatic conveying equipment (6) arranged between the cloth bag for sludge (5) and the cyclone fluidized bed gasification furnace (7).

3. The system according to claim 1, wherein the cyclone fluidized bed gasification furnace (7) comprises an ash conveying screw (709) arranged at its bottom, an air duct zone (701) is arranged above the ash conveying screw (709), a dense phase combustion zone (702) is arranged above the air duct zone (701), an air distribution plate (710) is arranged in the dense phase combustion zone (702), an ignition device (713) is further arranged on an inner wall of the dense phase combustion zone (702), a wet sludge inlet (706) and a biomass inlet (707) are further formed in the dense phase combustion zone (702), a drying zone (705) is arranged above the dense phase combustion zone (702), and a gasification outlet (712) is also formed in the drying zone (705).

4. The system according to claim 3, wherein an air duct (708) is arranged in the air duct zone (701), a bottom end of the air duct (708) communicates with the ash conveying screw (709), a top end of the air duct (708) is provided with an air chamber (715), a top of the air chamber (715) is connected with the air distribution plate (710), and a periphery of the air duct (708) is provided with an ash discharging channel (716).

5. The system according to claim 4, wherein a lean phase zone (704) is arranged above the dense phase combustion zone (702), a guide plate (711) is arranged on an inner periphery of the lean phase zone (704), and a top end of the lean phase zone (704) communicates with the drying zone (705).

6. The system according to claim 5, wherein the dense phase combustion zone (702) is further provided with a steam injection pipe (703).

7. The system according to claim 6, wherein a top of the drying zone (705) is provided with a diffusing pipe (714).

8. The system according to claim 3, wherein the air distribution plate (710) comprises a plurality of fan-shaped air nozzle plates (710*a*), each fan-shaped air nozzle plate (710*a*) has air nozzles (710*b*), and each air nozzle (710*b*) has an air disc (710*c*) arranged at its bottom.

\* \* \* \* \*